United States Patent [19]
Keller

[11] Patent Number: 5,164,891

[45] Date of Patent: Nov. 17, 1992

[54] LOW NOISE VOLTAGE REGULATOR AND METHOD USING A GATED SINGLE ENDED OSCILLATOR

[75] Inventor: Richard A. Keller, Palo Alto, Calif.

[73] Assignee: Power Integrations, Inc., Mountain View, Calif.

[21] Appl. No.: 748,240

[22] Filed: Aug. 21, 1991

[51] Int. Cl.⁵ .................... H02M 3/156; G05F 1/585
[52] U.S. Cl. ...................................... 363/79; 323/222; 363/80; 363/89
[58] Field of Search .............. 323/222; 363/16, 37, 363/97, 131, 79, 80, 89

[56] References Cited

U.S. PATENT DOCUMENTS

| | | | |
|---|---|---|---|
| 4,535,399 | 8/1985 | Szepesi | 363/97 |
| 4,605,999 | 8/1986 | Bowman et al. | 363/19 |
| 4,607,323 | 8/1986 | Kokal et al. | 363/97 |
| 4,791,546 | 12/1988 | Carroll | 363/97 |

FOREIGN PATENT DOCUMENTS

| | | | |
|---|---|---|---|
| 170358 | 10/1983 | Japan | 363/16 |
| 55067 | 3/1989 | Japan. | |
| 186164 | 7/1989 | Japan. | |
| 935919 | 6/1982 | U.S.S.R. | 323/222 |

*Primary Examiner*—William H. Beha, Jr.
*Attorney, Agent, or Firm*—Douglas L. Weller

[57] ABSTRACT

A voltage regulator generates an output voltage between an output line and an output reference voltage from an input voltage between an input line and an input reference voltage. The voltage regulator combines a self excited series resonant oscillator and a switching regulator control circuit. The self excited series resonant oscillator includes an oscillator circuit which produces an oscillating signal. The oscillating signal is rectified to produce a rectified signal. The rectified signal is filtered to produce the output voltage on the output line. The switching regulator control circuit switches the self excited series resonant oscillator on and off at a duty cycle which maintains the output voltage on the output line at a predetermined value.

8 Claims, 4 Drawing Sheets

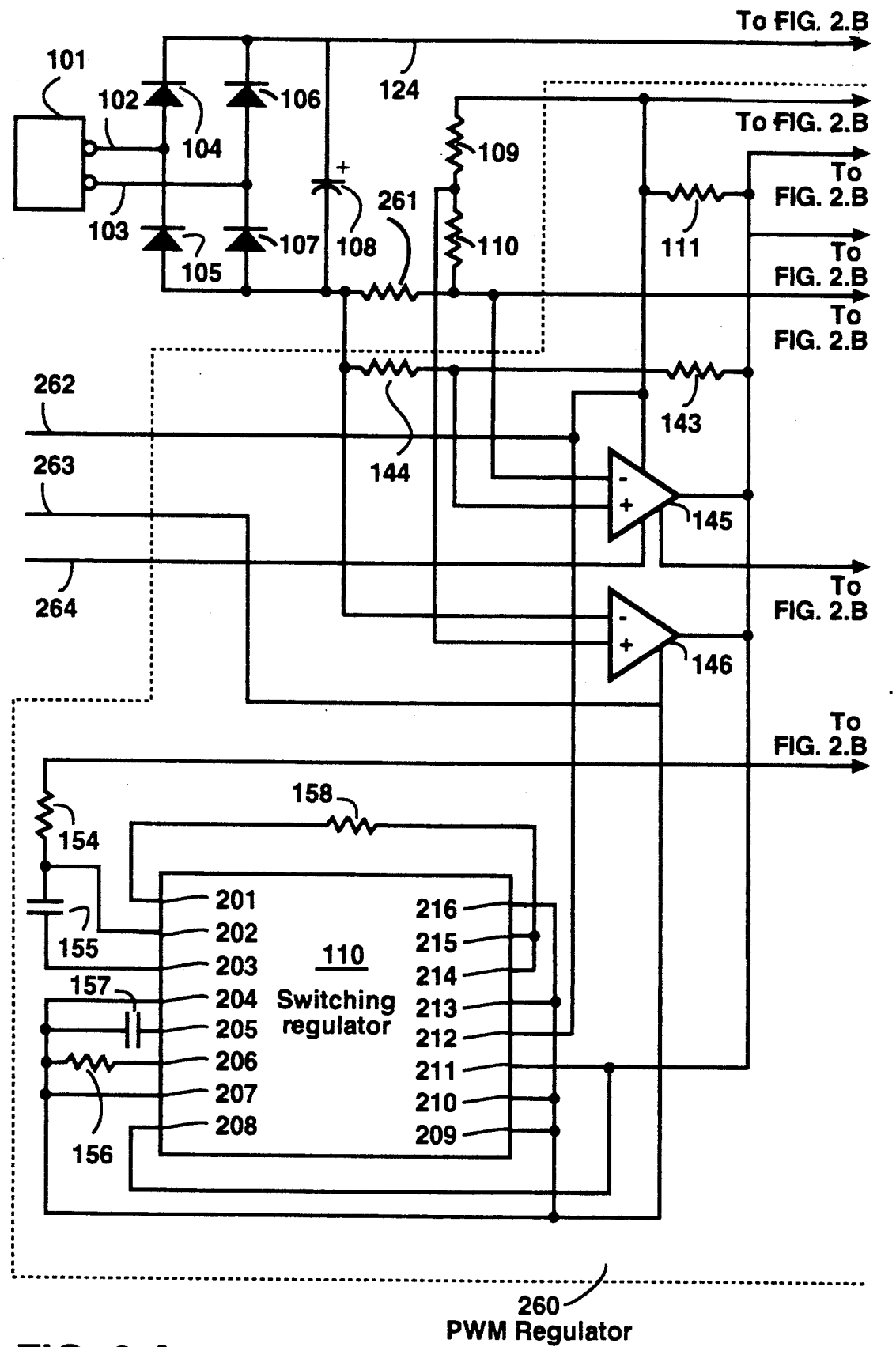
FIG. 2.A

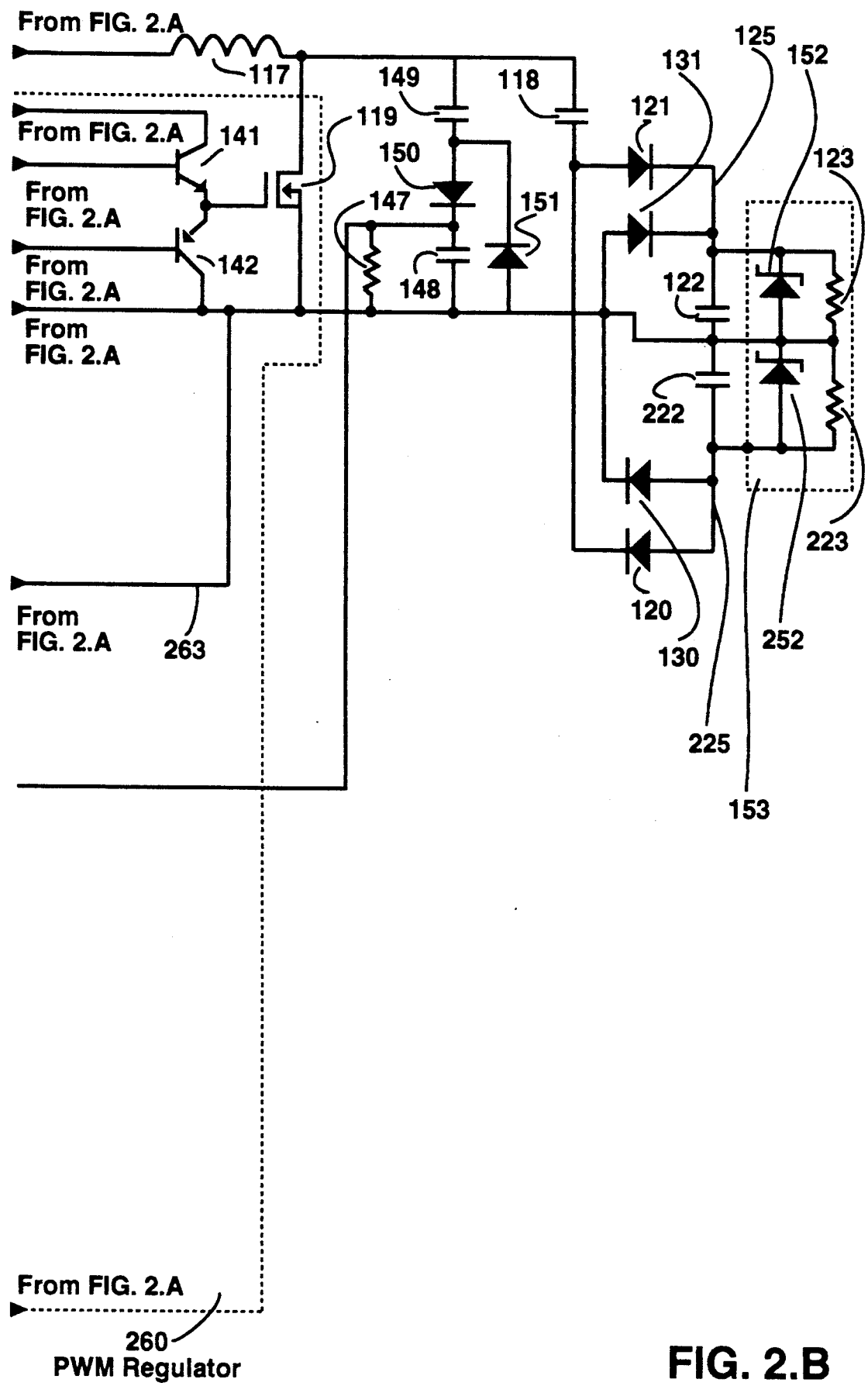
FIG. 2.B

LOW NOISE VOLTAGE REGULATOR AND METHOD USING A GATED SINGLE ENDED OSCILLATOR

BACKGROUND

The present invention concerns the construction of an efficient, low noise voltage regulator using a single winding magnetic element whose output and control and active power handling elements are all referenced to the circuit ground.

In DC power supplies, in general, a transformer is used to transform voltage from an available DC voltage level to a desired DC voltage level. The voltage level is transformed based on a turns ratio in the transformer.

Industry standard DC power supplies, as described above, which use transformers have several disadvantages. For example, the amount of windings used in the transformer can add significant, size, weight and manufacturing cost to the power supply. Also, the transformers generally transform voltage levels at a fixed ratio, which does not take into account different voltage levels of power sources.

SUMMARY OF THE INVENTION

In accordance with the preferred embodiment of the present invention, a voltage regulator is presented. The voltage regulator generates an output voltage between an output line and an output reference voltage from an input voltage between an input line and an input reference voltage. The voltage regulator combines a self excited series resonant oscillator and a switching regulator control circuit.

The self excited series resonant oscillator includes an oscillator circuit, for example, an inductor and a capacitor connected in series. The resonant oscillator produces a oscillating signal. The oscillating signal is rectified to produce a rectified signal. The rectified signal is filtered, for example by an averaging filter capacitor, to produce the output voltage on the output line.

The switching regulator control circuit switches the self excited series resonant oscillator on and off at a duty cycle which maintains the output voltage on the output line at a predetermined value. This is done, for example, based on a comparison of a reference voltage to a feedback voltage, the feedback voltage being related to the output voltage.

In the preferred embodiment, a current sensing resistor is connected between the output reference voltage and the input reference voltage. Based on the direction of current flow between the output reference voltage and the input reference voltage an end of the inductor is electrically connected to and disconnected from the output reference voltage by an active element, for example a switching transistor. For example, a first comparator is used to direct the switching transistor to disconnect the inductor from the output reference voltage when current flows from the input reference voltage to the output reference voltage. A second comparator is used to direct the switching transistor to disconnect the inductor from the output reference voltage when current flowing from the output reference voltage to the input reference voltage reaches a predetermined value.

The present invention allows for construction of a low noise voltage regulator using a single winding magnetic element. When used, for example, in a power supply for a device, the output of the regulator is referenced to the ground voltage of the device. Additionally, the control and active power handling elements of the voltage regulator are also referenced to the ground voltage of the device. Further, when the input voltage is generated by rectifying and averaging an AC voltage signal, the voltage regulator may be designed to produce an output voltage at a predetermined value regardless of whether the AC voltage is at 110 volts or 220 volts.

BRIEF DESCRIPTION OF THE DRAWINGS

FIGS. 2, 2A and 2B show a circuit diagram of a resonant regulator power supply which uses a voltage regulator in accordance with the preferred embodiment of the present invention.

DESCRIPTION OF THE PREFERRED EMBODIMENT

Figure 1:
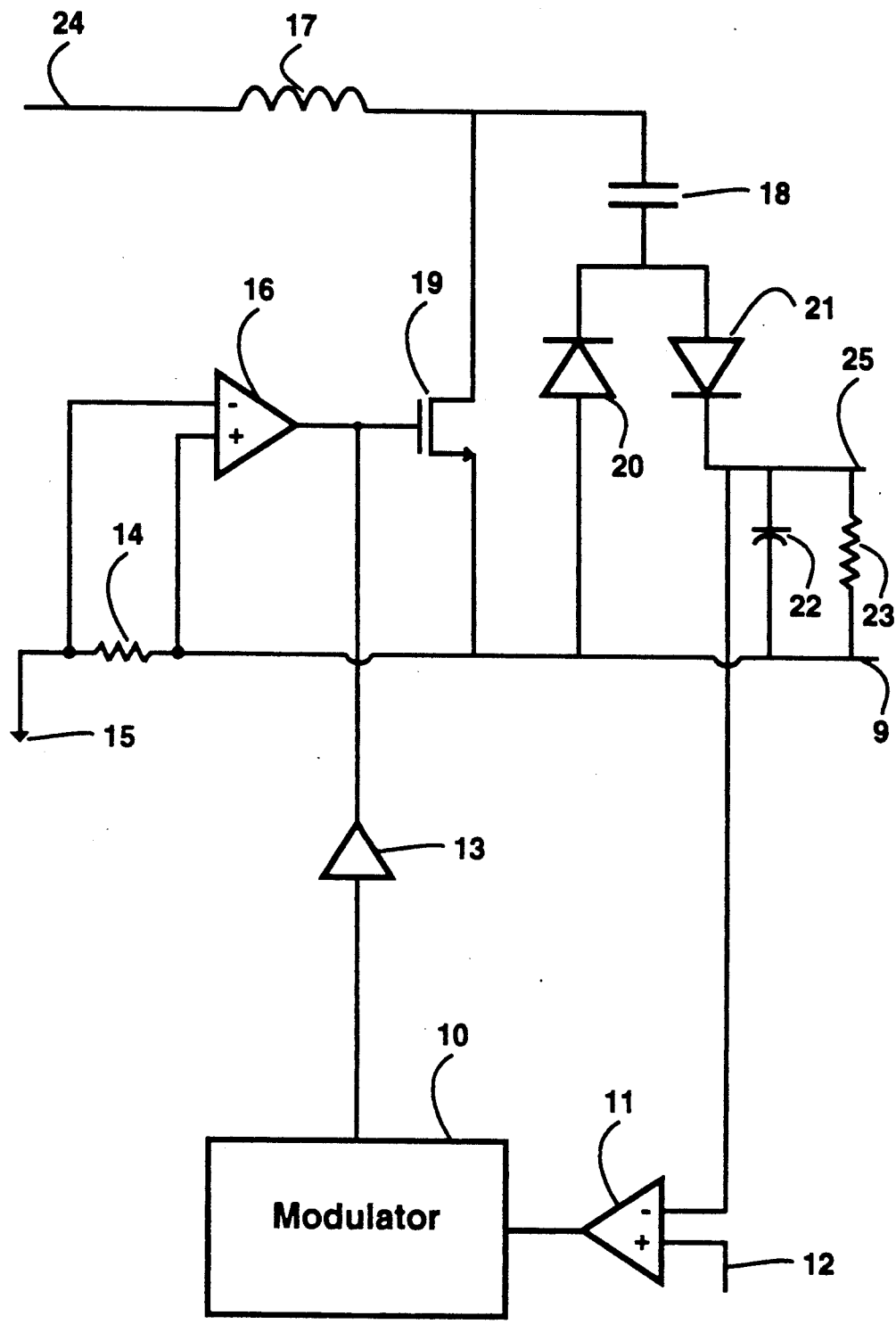
FIG. 1 shows a simplified block diagram of a voltage regulator in accordance with a preferred embodiment of the present invention.

FIG. 1 shows a block diagram of a voltage regulator in accordance with a simplified preferred embodiment of the present invention. An input DC voltage is placed on a line 24. The input DC voltage is measured from a input reference voltage (ground) 15. A series resonant oscillator provides an impedance between the input DC voltage on line 24, and the output DC voltage placed on an output line 25. The series resonant oscillator includes an inductor 17 and a capacitor 18 connected in series.

A transistor 19 functions as an active power handling element for the series resonant oscillator. Transistor 19 is controlled by a comparator 16 which sense current direction through a current sensing resistor 14. Transistor 19 is off when the current through current sensing resistor 14 is flowing backwards, i.e., flowing from input reference voltage 15 to an output reference voltage on a line 9. When the current through current sensing resistor 14 is flowing forwards, transistor 19 is on.

Forward current from the series resonant oscillator flows through a rectifying diode 21 and is stored in an averaging filter capacitor 22. Averaging filter capacitor 22 provides current through a load 23. Rectifying diode 20 is also connected as shown.

A constant output DC voltage level is maintained on line 25 by a switching regulator circuit. The switching regulator circuit includes a linear amplifier 11 which compares the output DC voltage on output line 25 with a reference voltage on a line 12. The output from linear amplifier 11 is used to control a modulator 10. Modulator 10, through an amplifier 13, periodically overrides the output of comparator 16 to turn transistor 19 off, effectively turning off the series resonant oscillator. The switching regulator circuit will gate the series resonant oscillator transistor 19 on and off at a frequency lower than the resonant oscillator frequency when the output voltage on line 25 is at the desired output voltage. When the output voltage on line 25 increases to be greater than the reference voltage on line 12, the switching regulator will increase the amount of off duty cycle for the transistor 19. Similarly, when the output voltage on line 25 decreases to be less than the reference voltage on line 12, the switching regulator will decrease the amount of off duty cycle for the transistor 19.

Figure 2:
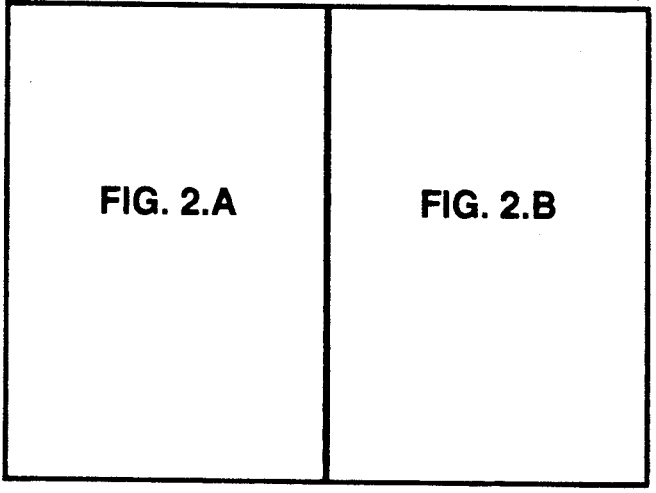

FIG. 2 shows the use of the present invention in a resonant regulator power supply in accordance with the preferred embodiment of the present invention. The resonant power supply is designed to present a 5 volt DC signal at 0.02 Amps on an output line 125 and a −5 volt DC signal at 0.02 Amps on an output line 225 from a signal between 100 volts and 350 volts DC on a DC input line 124.

An AC signal source 101 provides an AC signal, for example of 110 volts or 220 volts. The AC signal is rectified and filtered to present a DC signal on DC input line 124. This is done by a diode, 104, a diode 105, a diode 106, a diode 107 and a capacitor 108 connected as shown. Diodes 104-107, are for example, 1N4005 diodes. Capacitor 108 is, for example, 22 microfarads, rated at 400 volts.

A series resonant oscillator provides an impedance between the input DC voltage on DC input line 124, and the output DC voltages placed on output line 125 and output line 225. The series resonant oscillator includes an inductor 117 and a capacitor 118 connected in series as shown. Inductor 117 is, for example, 1.1 millihenries. Capacitor 118 is, for example, 100 picofarads.

In order to produce the output signal, the resonant signal is rectified and filtered. This is done, for example, by a diode 120, a diode 121, a diode 130, a diode 131, a capacitor 122 and a capacitor 222. Diodes 120, 121, 130 and 131 are, for example, 1N4148 diodes. Capacitor 122 is, for example, 0.1 microfarads. Capacitor 222 is, for example, 0.1 microfarads. A load 153 is represented by resistance 123, a resistance 223, a zener diode 152 and a zener diode 252. For example, zener diode 152 and zener diode 252 each have a value of five volts.

A low noise pulse width modulator 260 serves to regulate the output DC voltage level on output line 125. Within low noise pulse width modulator 260, an active power handling element for the series resonant oscillator includes a transistor 119 controlled by a transistor 141 and a transistor 142. Transistor 119 is, for example, a 2SK808 transistor. Transistor 141 is, for example, a 2N2222 transistor connected as shown. Transistor 142 is, for example, a 2N2907 transistor connected as shown.

The collector of transistor 141 is connected to a ten volt DC power source (not shown) through a line 262. The collector of transistor 142 is connected to a return for the ten volt DC power source through a line 263. A comparator 145 and a comparator 146 control the switching off of transistor 119 based on current flow through a current flow resistor 261. When comparator 146 senses that there is a current is flowing backward through current flow resistor 261, comparator 146 pulls the base of transistor 141 and transistor 142 low, which turns off transistor 119. When current is flowing forward through current flow resistor 261, a resistor 111 connected the ten volt DC power source through line 262 pulls the base of transistor 141 and transistor 142 high, switching on transistor 119, until a predetermined current is flowing through resistor 261, for example 0.1 amps. When the predetermined current is reached, comparator 145 pulls the base of transistor 141 and transistor 142 low, which turns off transistor 119.

During the time period prior to transistor 119 being turned on, the voltage across the source and drain of transistor 119 will decrease to zero due to the action of the resonant circuit elements. Transistor 119 will thus turn on with no voltage across its source and drain, thus reducing turn on losses. When transistor 119 is on, current through its source and drain will be increasing linearly and energy will be stored in inductor 117. When transistor 119 is turned off, the current flowing through inductor 117 will be directed to resonant capacitor 118. This reduces the switching turn off losses.

For example, comparator 145 is an LM319 comparator connected as shown. Comparator 146 is an LM319 comparator connected as shown. Current flow resistor 261 is 27 ohms. Resistor 111 is one kilohm. A resistance 109 is a 100 kilohm resistor connected as shown. A resistance 110 is a 100 ohm resistor connected as shown. A resistance 144 is a 2.2 kilohm resistor connected as shown. A resistance 143 is a 10 kilohm resistor connected as shown. A line 264 is connected to a −10 volt DC power source.

A feedback signal for low noise pulse width modulator 260 is provided by a capacitor 149, a diode 150, a diode 151 a capacitor 148 and a resistor 147 connected as shown. Capacitor 149 is, for example 24 picofarads. Diodes 150 and 151 are, for example, 1N4148 diodes. Capacitor 148 is, for example, 0.1 microfarads. Resistor 147 is, for example, 2.2 kilohms.

A switching regulator 110 receives the feedback signal through a resistor 154 and produces a pulse width modulated signal on an output 211. Output 211 is connected to the base of transistor 141 and the base of transistor 142, as shown. The duty cycle of the pulse width modulated signal on output 211 is adjusted by switching regulator 110 so that the effective impedance of resonating capacitor 149 provides the correct current to regulated voltage load impedance 147 to maintain the correct regulation voltage.

Resonating capacitor 118 functions as a regulated impedance. The voltage across capacitor 118 is not regulated. Switching regulator 110 effectively regulates the impedance across capacitor 118 so that within the anticipated range of output voltages across load 153 (i.e. less than twenty volts), the current through capacitor 118 and the current through load 153 will be regulated by switching regulator 110 while the voltage across capacitor 118 and the voltage across load 153 will not be regulated by switching regulator 110.

The load voltage across load resistor 123 and load resistor 223 is regulated by zener diode 152 and zener diode 252, respectively. The output voltage across load resistor 123 and load resistor are respectively set by select voltages across zener diode 152 and across zener diode 252. The current flowing into load 153 is approximately the current flowing through regulated output load impedance 147 times the ratio of the value of capacitance 118 to the value of capacitance 149.

For example, switching regulator 110 is a TL494 switching regulator available from Texas Instruments, having a business address of P.O. Box 225012, Dallas Tex. 75265. Switching regulator 110 has inputs and outputs 201 through 216 connected as shown. Inputs and outputs 201 through 216 correspond respectively to pins 1 through 16 of the TL494 switching regulator. Resistor 154 is 10 kilohms. A resistance 158 is a 10 kilohm resistor. A capacitance 155 is a 0.1 microfarad capacitor. A capacitance 157 is a 0.01 microfarad capacitor. A resistance 156 is a 6.2 kilohm capacitor.

The foregoing discussion discloses and describes merely exemplary methods and embodiments of the present invention. As will be understood by those familiar with the art, the invention may be embodied in other specific forms without departing from the spirit o essential characteristics thereof. Accordingly, the disclosure of the present invention is intended to be illustrative, but not limiting, of the scope of the invention, which is set forth in the following claims.

I claim:

1. A voltage regulator which generates an output voltage between an output line and an output reference voltage from an input voltage between an input line and an input reference voltage, the voltage regulator comprising:
   a resonant oscillator coupled tot he output line which produces an oscillating signal, the resonant oscillator including
   an inductor having a first end and a second end, the first end being coupled to the input line,
   a capacitor having a first end and a second end, the first end of the capacitor being coupled to the second end of the inductor,
   current sensing means, coupled between the output reference voltage and the input reference voltage, for detecting a direction of current flow between the output reference voltage and the input reference voltage; and,
   switching means, coupled between the second end of the inductor and the output reference voltage, for electrically connecting and disconnecting the second end of the inductor and the output reference voltage, the switching means having a control input coupled to the current sensing means;
   rectifying means, coupled between the output line and the second end of the capacitor for producing a rectified signal from the oscillating signal;
   filtering means, coupled between the output line and the output reference voltage, for averaging current of the rectified signal to produce the output voltage on the output line; and,
   switching regulator means, coupled to the control input of the switching means, for switching on and off the resonant oscillator at a duty cycle which maintains the output voltage on the output line at a predetermined value.

2. A voltage regulator as in claim 1 wherein the input voltage is generated by rectifying and averaging an AC voltage signal.

3. A voltage regulator as in claim 1, additionally comprising:
   feedback means, coupled to the output line and to the switching regulator means, for generating a feedback voltage for use by the switching regulator means.

4. A voltage regulator which generates an output voltage between an output line and an output reference voltage from an input voltage between an input line and an input reference voltage, the voltage regulator comprising:
   a resonant oscillator coupled to the output line which produces an oscillating signal, the resonant oscillator including an inductor and a capacitor coupled in series, current sensing means, coupled between the output reference voltage and the input reference voltage, for detecting a direction of current flow between the output reference voltage and the input reference voltage, and switching means, controlled by the current sensing means, for electrically connecting and disconnecting an end of the inductor and the output reference voltage;
   rectifying means, coupled between the output line and the resonant oscillator for producing a rectified signal from the oscillating signal;
   filtering means, coupled between the output line and the output reference voltage, for averaging current of the rectified signal to produce the output voltage on the output line; and,
   switching regulator means, coupled to the resonant oscillator, for switching on and off the resonant oscillator at a duty cycle which maintains the output voltage on the output line at a predetermined value;
   wherein the current sensing means includes:
   a resistance coupled between the input reference voltage and the output reference voltage;
   first comparator means, connected to the resistance and the switching means, for causing the switching means to disconnect the end of the inductor from the output reference voltage when current flows from the input reference voltage to the output reference voltage; and,
   second comparator means, connected to the resistance and the switching means, for causing the switching means to disconnect the end of the inductor from the output reference voltage when current flowing from the output reference voltage to the input reference voltage reaches a predetermined value.

5. A method for generating an output voltage between an output line and an output reference voltage from an input voltage between an input line and an input reference voltage, the method comprising the steps of:
   (a) producing an oscillating signal from the input voltage using an inductor connected at a first end to a capacitor, including the substeps of
   (a.1) detecting a direction of current flow between the output reference voltage and the input reference voltage; and
   (a.2) electrically connecting and disconnecting the first end of the inductor and the output reference voltage based on the direction of current flow detected in step (a.1);
   (b) rectifying the oscillating signal to produce a rectified signal;
   (c) averaging current of the rectified signal to produce the output voltage on the output line; and,
   (d) switching on and off the oscillating signal at a duty cycle which maintains the output voltage on the output line at a predetermined value.

6. A method as in claim 5, wherein substep (a.2) additionally includes:
   disconnecting the end of the inductor from the output reference voltage when current flows from the input reference voltage to the output reference voltage; and,
   connecting the end of the inductor from the output reference voltage when current flowing from the output reference voltage to the input reference voltage reaches a predetermined value.

7. A method as in claim 5 additionally including the step of:
   (e) generating the input voltage by rectifying and averaging an AC voltage signal.

8. A method as in claim 5, additionally including the step of:
   (e) generating a feedback voltage for use by the switching regulator means.

* * * * *